June 19, 1951 J. D. STAPLES ET AL 2,557,481
MEASURING WHEEL
Filed Oct. 12, 1948 2 Sheets-Sheet 1
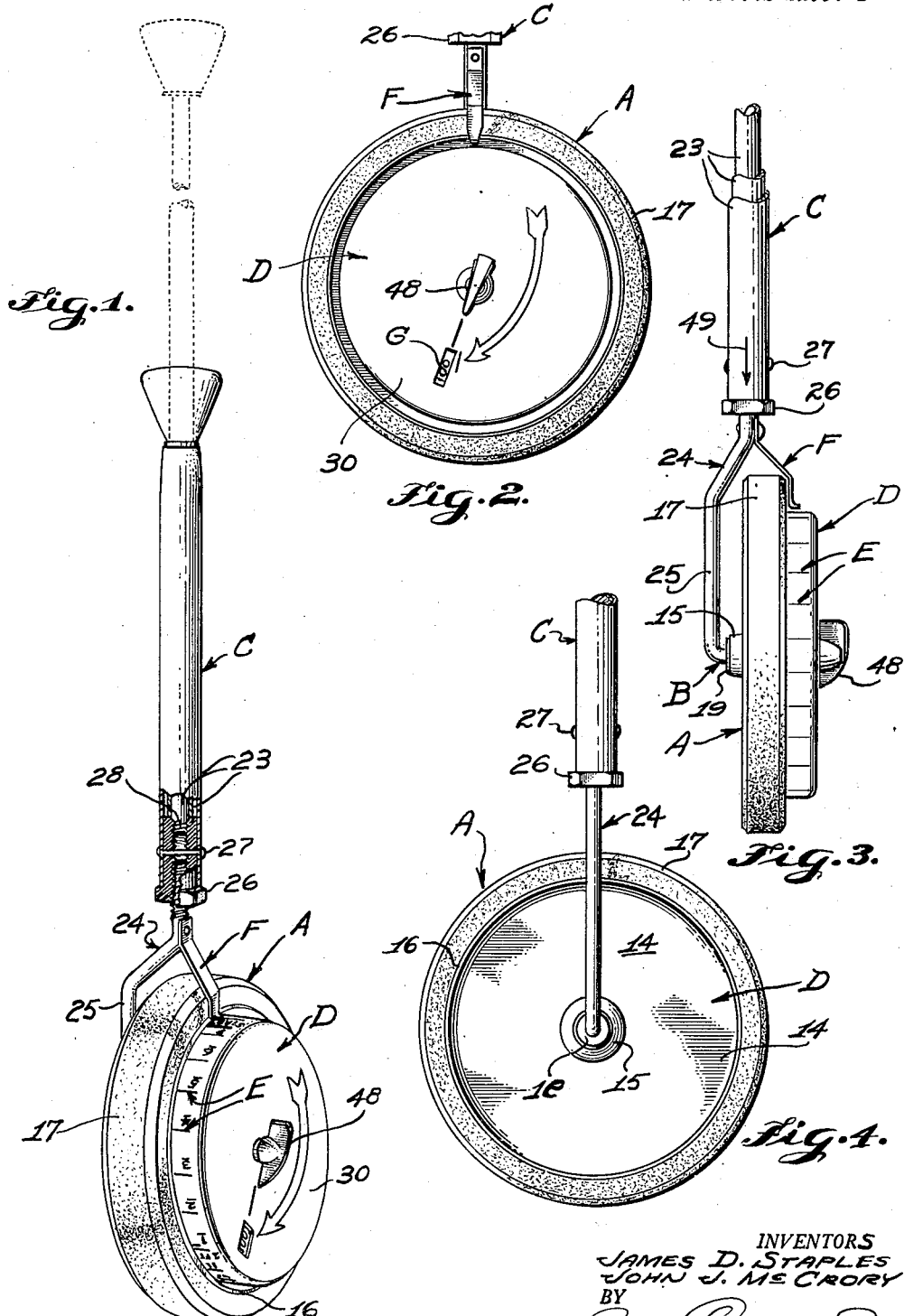
INVENTORS
JAMES D. STAPLES
JOHN J. McCRORY
BY
Jesse C. Martin Jr.
ATTORNEY June 19, 1951  J. D. STAPLES ET AL  2,557,481
MEASURING WHEEL
Filed Oct. 12, 1948  2 Sheets-Sheet 2

INVENTOR.
JAMES D. STAPLES
JOHN J. McCRORY
BY
ATTORNEY

Patented June 19, 1951

2,557,481

UNITED STATES PATENT OFFICE 2,557,481

MEASURING WHEEL

James D. Staples and John J. McCrory, Alhambra, Calif., assignors to Rolatape Incorporated, a corporation of California Application October 12, 1948, Serial No. 54,184

5 Claims. (Cl. 33—141)

This invention relates to measuring instruments of the roller or wheel type for taking lineal measurements and its primary purpose is to provide a measuring wheel which is characterized by the improvements and advantages as follows:

1. A measuring wheel unit wherein the wheel member thereof is provided with a laterally projecting cylindrical extension of less diameter than remainder of the unit so that in effect the unit has two peripheries of differential circumferences, one to serve as the tread of the unit and the other to serve as a measuring dial for indicating the lineal travel of the wheel per fractions of a revolution thereof up to one revolution. An advantage of this arrangement is that the dial periphery is at all times spaced from contact with the surfaces over which the tread of the wheel member traverses so that the measurement marking which are conveniently readable from above, are protected against being soiled, erased, or otherwise made illegible. Another advantage is that the lateral extension serves as a housing for a revolution-counting and indicating mechanism arranged to show at all times the lineal travel of the wheel member in terms of feet, yards or other measurement divisions per revolution of the wheel. A further advantage is that this construction makes it possible to inexpensively produce the wheel and lateral extension.

2. A simple and efficient revolution-counting and indicating mechanism which indicates through a window on the outer side of the lateral extension of the wheel member, the lineal distance traversed per revolution thereof and which is characterized by an audible signal which sounds when the wheel member has traveled a predetermined distance.

3. A simple and effective means for resetting the revolution-counting and indicating mechanism.

4. A collapsible and extensible handle affording adjustment best to suit the particular operation and the conditions at hand as well as making it possible to pack or store the unit in small compass.

5. An arrangement of the wheel, an axle therefor, an extensible handle to which the axle is fixed and a pointer on the handle, which makes it possible for the operator to walk erect while measuring and to swing the handle into different positions relative to the wheel best to suit the operator and for the purpose of disposing the pointer in a starting and reading position which for example is attained when the handle is in a vertical position. When the handle is returned to this position after a given measuring operation, the reading of the dial as determined by the pointer, will indicate the fractional distance, say in inches that the wheel has traveled less than a complete revolution and which is over and above the reading in feet or yards, or the like afforded by the revolution-counting and indicating means.

While we have shown and described a specific embodiment of our invention we do not limit ourselves to the exact details of construction set forth, and the invention embraces such changes, modifications and equivalents of the parts and their formation and arrangement as come within the purview of the appended claims.

Fig. 1 is a perspective view of a measuring instrument embodying the present invention, with the handle pointer and wheel in proper position to start a measuring operation, Fig. 2 is a fragmentary side elevation of the instrument looking toward the outer side of the extension to show the indicating window of the counting and indicating mechanism, Fig. 3 is a fragmentary front elevation of the instrument, Fig. 4 is a fragmentary side elevation of the instrument looking toward the side thereof opposite that shown in Fig. 2, Fig. 5 is a fragmentary side elevation with the outer side of the cylindrical extension broken away to show parts of the counting indicating means housed in the extension, Fig. 6 is a sectional view taken on the plane of line 6—6 of Fig. 5, Fig. 7 is a sectional view taken on the plane of line 7—7 of Fig. 6, Fig. 8 is an elevational view of the ratchet disk showing the dial face thereof, Fig. 9 is a fragmentary elevational view with the indicating window and indicating dial showing a typical measurement, Fig. 10 is a fragmentary elevational view showing the pointer and dial as indicating a typical measurement, and Fig. 11 is a diagrammatic view showing one manner of use of the measuring wheel.

One embodiment of this invention as shown in the accompanying drawing generally comprises a measuring wheel member A, an axle B on which the wheel member is mounted to rotate relative thereto, a handle C supporting the axle and by means of which the wheel member is propelled in measuring operations, a cylindrical member D of less diameter than the wheel member, carried thereby, projecting laterally therefrom and provided with a measuring dial E on the periphery thereof; a pointer F on the handle for cooperation with the dial E, and a counting and indicating means G housed in said cylindrical member for recording and indicating the revolutions of the wheel member.

As here shown the wheel member A includes a circular disk-like body 14 having hub 15 and a rim 16 on which latter is mounted a suitable tire 17 of rubber or synthetic rubber as the tread of the wheel member.

The axle B carried by the handle C extends through the hub 15 and has a flange 19 thereon adjacent one end abutting one end of the hub. On the other end of the axle is a washer 20 abutting the other end of the hub 15 and held in place by means of a spring washer 21 in turn held on the axle and under compression by means of a pin 22 as shown in Figs. 6 and 7.

The handle C is collapsible and extensible being made of telescopic tubular sections 23 and a lower rod section 24 which latter is offset as at 25 and at its lower end is formed integral or otherwise fixed to the axle B, the offset making it possible to center the handle over the tread of the wheel. The lowermost of the tubular sections 23 has a nut 26 fitted thereto and held therein by a pin or rivet 27 whereby the threaded upper end of the rod section 24 may be turned in the nut to hold the handle assembled. This nut is also adapted to receive the threaded lower end 28 of the outermost or uppermost of the sections 23 to hold the handle in collapsed position as indicated in Fig. 1. At their outer ends the intermediate and lowermost of the tubular sections 23 are somewhat constricted while the lower ends of the uppermost and intermediate tubular section are somewhat enlarged whereby the telescopic sections are prevented from being pulled apart or disjointed and provision is made for a reliable frictional holding thereof in extended position.

In the present embodiment of this invention, the cylindrical member D is a separate member having its outer end closed by an integral wall 30 and being open on its inner end which latter is closed by one side of the body 14 of the wheel member. However, it is obvious the wheel member and extension could be made as a one-piece casting or stamping. Studs 31 projecting from said one side of the body 14 of the wheel member and screws 32 serve to hold the extension D in concentric relation to the wheel member for rotation or turning movement therewith.

It should be noted that the wheel member A has a definite diameter so that with each revolution it will traverse a given distance, for example with a diameter of 7.64 inches as in the present embodiment, the distance traveled per revolution will be two feet. The cylindrical member D as here shown has a diameter of approximately 6 inches and therefore has its periphery well spaced from contact with the surface over which the wheel is moved in all measuring operations. This arrangement insures that the dial markings E on the periphery of the member D will be kept clean and legible at all times. In this connection it should be noted that the dial E is calibrated and so graduated and marked in consideration of the differential diameters of the wheel proper and the member D, that the dial will indicate the wheel travel in inches up to one complete revolution thereof.

The counting and indicating means G for recording and indicating the distance traveled per revolution of the wheel includes a ratchet disk 33 rotatably mounted on the inner face of the wall 30 of the member D, being fixed on a rotary shaft 34 which is extended through the wall 30 and is coaxial with the wheel axle B. On the face of the ratchet disk opposite the wall 30 is a circular series of markings 35 in the form of figures for example from 2 to 100 in multiples of 2 and which are visible through a window or opening 36 in the wall 30 and arranged so that movement of the wheel per each ratchet tooth will show a 2 foot gain in the measurement reading through the window 36, due to the fact that the ratchet arrangement which will be hereinafter described is such that the ratchet disk will move in that manner per each revolution of the wheel.

The ratchet disk 33 is moved to indicate the distance traveled per revolution of the wheel A, by means of a pawl 37 pivoted on a pin 37' on an arm 38 in turn pivoted as at 39 to the wall 30. A spring 38' on the pin 37' urges the pawl against the ratchet teeth. A spring 40 fixed at one end to the wall 30 as at 41 and at its other end to the arm 38 holds the arm against a stop 41'. The arm 38 and pawl are moved so as to advance the ratchet disk one tooth per each revolution of the measuring wheel by means of the pin 22 carried by the axle B which pin will be contacted by an extension 42 of the arm 38 pivoted on the pin 37' between its ends, thereby moving the arm 38 and pawl 37 to advance the ratchet disk as aforesaid. The arm extension 42 is loaded by the spring 38' so that an outwardly projecting portion 44 thereon is held in position for contacting the pin 22 each time the wheel A makes one revolution. A stop lug 45 on the other end of the extension 42 limits the movement thereof relative to the pawl-supporting arm 38 so that when the portion 44 encounters the pin 22, the arm 42 and extension 38 will move as one member in a direction for moving the pawl into contact with the teeth of the ratchet wheel and advancing the ratchet wheel one tooth per revolution of the measuring wheel in one direction. The arm 38 swings past the pin as the wheel continues to rotate and the spring 40 then returns the arm and pawl to starting position. This return of the arm 38 causes it to strike the stop 41' forcibly so that a definite and sharp click is sounded as an audible signal to indicate to the operator that the wheel has traversed two lineal feet. The cylindrical hollow extension D acts as a sound box to intensify the audible signal. Should the measuring wheel be rotated in the opposite direction by mistake, the end portion 44 on encountering the pin 22 will cause the extension to swing on its pivot without moving the arm 38 and the pin will move past portion 44 without actuating the pawl. The spring 38' returns the extension to normal position when the portion 44 clears the pin 22.

As a means for setting the ratchet disk so that the dial marking "100" is visible in the opening 36, this being the starting position for any measuring operation to be recorded and indicated, a handle 48 is fixed on the outer end of the rotary shaft 34 to which the ratchet disk is fixed.

When the wheel A is turned to a position in which the peripherial dial marking designated by the legend "Start" is uppermost and the handle is moved into vertical position with the pointer over the word "Start," and the revolution counting means G has been set as shown in Fig. 1 with 100 mark visible, the instrument is ready for use, it being noted that an arrow 49 on the handle must be on the front side of the handle as shown in Fig. 3, in order that the measuring wheel will be turned in the right direction for operating the ratchet mechanism to record each revolution of the measuring wheel.

After the setting of the revolution counting means G and the handle C at the starting position, the trailing edge of the wheel is aligned with the point from which a measurement is to be taken and the operator may now propel the wheel along the line of measurement desired and may take note when each two feet of measurement has been made by the sharply audible click caused by the striking of the pawl carrying arm 38 against the stop 41' by the action of the spring 40, at the completion of each revolution of the wheel. The measuring movement is stopped when the leading edge of the wheel aligns with the point to which the measurement is to be reckoned and the operator now moves the handle to vertical position without moving or turning the wheel and the pointer F will come to position over the dial E to indicate the number of inches the wheel has traveled over and above the two foot measurements recorded by the means G and indicated by means of one of the markings 35 through the opening 36. In this manner the exact measurement may be determined with considerable ease by adding the two readings.

Fig. 11 shows in diagram how a measurement may be made between walls W and Y or the like. The representation S of the wheel against the wall W shows how the instrument is positioned to start the measurement, the handle C and other parts being in the starting position such as hereinbefore noted. The operator now pushes the wheel away from the wall and propels it as indicated by the representation T of the wheel appearing between the walls and finally brings the wheel against wall Y as indicated at U. The handle is now swung into the vertical position indicated by the dotted lines to position the pointer F over the top of the dial E whereby a reading of the dial may be taken. This reading and the reading afforded by the markings 35 on the disk 34 will give the correct measurement as between the walls.

Typical measurement readings are shown in Figs. 9 and 10, the former indicating a 10 ft. measurement and the latter showing a 1 ft. 11 inch measurement, thus showing that the total distance measured by the wheel was 11 ft. 11 inches.

It will now be apparent that we have provided a simple form of measuring instrument which may be generally applied for taking various measurements much more readily and easily than it would be possible with tapes and like measuring devices.

While we have shown and described a specific embodiment of our invention we do not limit ourselves to the exact details of construction set forth, and the invention embraces such changes, modifications and equivalents of the parts and their formation and arrangement as come within the purview of the appended claims.

We claim:

1. A measuring wheel comprising a hollow wheel unit closed on both sides and having portions of differential diameters, the portion of greater diameter providing the tread of the wheel unit, the other portion having its periphery spaced inwardly of said tread and provided with graduations calibrated to indicate the lineal distance traversed by the tread per each predetermined part of a revolution of the wheel unit up to a complete revolution thereof, an axle on which said unit is rotatable, a handle to which the axle is fixed, a pointer on the handle arranged to point to the graduation which indicates the distance traveled by the unit when less than a complete revolution thereof has taken place, upon movement of the handle into a predetermined position relative to said unit at the completion of a measurement rotation of the unit, a ratchet disk rotatably mounted within the hollow wheel unit on one of the sides of the latter, a pawl mechanism pivoted on said one side of the wheel unit for operating said ratchet disk, said ratchet disk having measurement indicia thereon, said one side of said wheel unit having a window through which said indicia is visible, and a trip member fixed to said axle for contacting and moving said pawl mechanism so as to turn said ratchet disk each time the wheel unit makes one complete revolution.

2. In a measuring wheel, a wheel unit, an axle on which said wheel unit is mounted to rotate, a handle fixed to said axle, and by means of which the wheel unit may be rolled over a surface to be measured, and a counter means associated with the wheel unit including a circular disk rotatably mounted on the wheel unit so as to turn therewith, and to turn on its axis relative to said wheel unit, ratchet teeth on the periphery of said disk, a pawl mechanism mounted to rotate with said wheel unit and being operative for engaging said teeth and turning said disk relative to said wheel unit, said disk having measurement indicia on a side surface thereof visible on one side of the wheel unit, and a trip member fixed to said axle and extending therefrom so as to contact and move said pawl mechanism for turning said disk relative to the wheel unit as the wheel unit completes each revolution.

3. In a measuring wheel, a wheel unit, an axle on which said wheel unit is mounted to rotate, a handle fixed to said axle, and by means of which the wheel unit may be rolled over a surface to be measured, and a counter means associated with the wheel unit including a ratchet disk rotatably mounted on the wheel unit on an axis which is coaxial with that of the wheel unit whereby the disk will turn with the wheel unit and may be turned relative thereto, said disk having measurement indicating characters on a side surface thereof visible on one side of the wheel unit, a pawl pivoted on the wheel for rotation on its axis as well as with the wheel unit, spring means urging said pawl into position for contacting the teeth of the ratchet disk, means on the wheel unit operable at will for turning the disk relative to the wheel unit to set the disk, means on the wheel providing a window through which said characters are visible one at a time, and a trip member fixed to said axle so as to turn therewith when the handle is moved and turns the axle relative to the wheel unit, said trip member being disposed to contact and move said pawl so as to turn said disk on its axis as the wheel unit completes each revolution.

4. In a measuring wheel, a wheel unit, an axle on which said wheel unit is mounted to rotate, a handle fixed to said axle and by means of which the wheel unit may be rolled over a surface to be measured, and a counter means associated with the wheel unit including a ratchet disk mounted on the wheel unit to rotate relative thereto as well as therewith and having a plurality of measurements indicating characters thereon, means on the wheel unit affording visibility of said characters one at a time, a pawl pivoted on the wheel to turn therewith as well as on its pivot, spring means for urging the pawl against the teeth of said ratchet disk, a trip member fixed to said axle, a spring-loaded member pivoted on said pawl in position to contact said trip member and move the pawl for turning the disk on its axis as the wheel unit in being rotated in one direction makes each complete revolution, then moving past said trip member; a stop member on said spring-loaded member normally abutting said pawl to prevent pivotal movement of the spring-loaded member relative to the pawl when the trip member is contacted for moving the pawl to turn said disk, said spring-loaded member being moved on its pivot relative to the pawl without moving the pawl, when being contacted with and moving past said trip member during rotation of the wheel in the direction opposite that in which said pawl is actuated to turn said disk.

5. In a measuring wheel, a wheel unit, an axle on which said wheel unit is mounted to rotate, a handle fixed to said axle and by means of which the wheel unit may be rolled over a surface to be measured, and a counter means on the wheel unit including a ratchet disk mounted on the wheel unit to rotate relative thereto as well as with the wheel unit and having a plurality of measurement indicating characters thereon, means on the wheel unit affording visibility of said characters one at a time, a pawl pivoted on the wheel unit to turn therewith as well as on its pivot, spring means for urging the pawl against the teeth of said ratchet disk, a trip member fixed to said axle, a spring loaded member pivoted on said pawl in position to contact said trip member and move the pawl for turning the disk on its axis as the wheel unit in being rotated in one direction makes each complete revolution, then moving past said trip member; a stop member on said spring-loaded member normally abutting said pawl to prevent pivoted movement of the spring-loaded member relative to the pawl when the trip member is contacted for moving the pawl to turn said disk, said spring-loaded member being moved on its pivot relative to the pawl without moving the pawl when being contacted with and moving past said trip member during rotation of the wheel in the direction opposite that in which said pawl is actuated to said disk, and a stop member on said wheel unit against which the pawl is forcibly struck by said spring means for making an audible signal when the pawl moves past the trip member following each disk-turning actuation of the pawl.

JAMES D. STAPLES.
JOHN J. McCRORY.

REFERENCES CITED

The following references are of record in the file of this patent:

UNITED STATES PATENTS

| Number | Name | Date |
| --- | --- | --- |
| 88,203 | Pease et al. | Mar. 23, 1869 |
| 211,327 | Heberline et al. | Jan. 14, 1879 |
| 437,065 | Wells | Sept. 23, 1890 |
| 530,686 | Gray | Dec. 11, 1894 |
| 1,203,103 | Dorwin | Oct. 31, 1916 |
| 1,433,640 | Morneau | Oct. 31, 1922 |
| 1,759,992 | McCarthy | May 27, 1930 |
| 2,295,787 | Hirth | Sept. 15, 1942 |

FOREIGN PATENTS

| Number | Country | Date |
| --- | --- | --- |
| 476,272 | France | May 3, 1915 |